United States Patent
Crump et al.

(10) Patent No.: US 7,330,896 B1
(45) Date of Patent: *Feb. 12, 2008

(54) CORRELATING DATA STREAMS OF DIFFERENT PROTOCOLS

(75) Inventors: Richard Crump, Boston, MA (US); Janet Yung Doong, Chelmsford, MA (US)

(73) Assignee: Nortel Networks Limited (CA)

( * ) Notice: Subject to any disclaimer, the term of this patent is extended or adjusted under 35 U.S.C. 154(b) by 532 days.

This patent is subject to a terminal disclaimer.

(21) Appl. No.: 10/814,963

(22) Filed: Mar. 31, 2004

Related U.S. Application Data

(62) Division of application No. 09/511,847, filed on Feb. 24, 2000, now Pat. No. 6,823,386.

(60) Provisional application No. 60/121,661, filed on Feb. 25, 1999.

(51) Int. Cl.
   *G06F 15/16* (2006.01)
(52) U.S. Cl. ........................ 709/227; 370/392
(58) Field of Classification Search ........ 709/200–203, 709/223–227, 238, 245; 370/392–393
   See application file for complete search history.

(56) References Cited

U.S. PATENT DOCUMENTS

| | | | |
|---|---|---|---|
| 5,815,664 A * | 9/1998 | Asano | 709/227 |
| 6,381,646 B2 * | 4/2002 | Zhang et al. | 709/227 |
| 6,507,864 B1 * | 1/2003 | Klein et al. | 709/201 |
| 6,678,269 B1 * | 1/2004 | Michels et al. | 370/389 |
| 6,714,969 B1 * | 3/2004 | Klein et al. | 709/219 |
| 7,013,333 B1 * | 3/2006 | Skells | 709/223 |
| 7,072,339 B2 * | 7/2006 | Tsuchiya et al. | 370/392 |
| 2002/0002621 A1 * | 1/2002 | Zhang et al. | 709/238 |
| 2005/0243828 A1 * | 11/2005 | Tsuchiya et al. | 370/392 |

* cited by examiner

*Primary Examiner*—Moustafa Meky
(74) *Attorney, Agent, or Firm*—McGuinness & Manaras LLP

(57) ABSTRACT

A single address configuration table entry maps multiple source devices in a source network to a single destination device in a destination network. The single address configuration table entry is used when any of the source devices initiates a connection to the destination device. The single address configuration table entry includes a "wildcard" for matching the source address of connection requests that are originated by any of the multiple source devices and destined for the destination device. When a connection is initiated by a source device, certain address/channel information is dynamically allocated in order to map the source device to the destination device. A dynamic routing table entry is installed in a dynamic routing table in order to map the source device to the destination device using the dynamically allocated address/channel information.

12 Claims, 10 Drawing Sheets

Upstream Side
Downstream Side
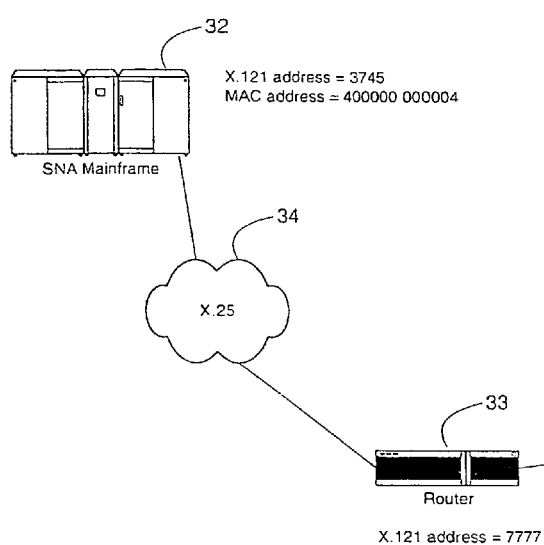
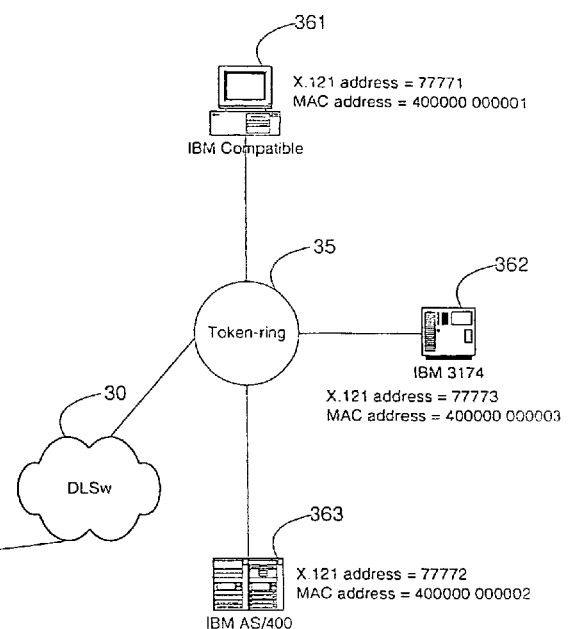
FIG. 3  300
PRIOR ART

FIG. 7    700

| | 802 | 804 | 806 | 808 | 810 |
|---|---|---|---|---|---|
| | Map Name | Adjacent X.121 Address | Partner X.121 Address | Adjacent MAC Address | Partner MAC Address |
| 812 - | AS400_map | 77772 | 4444 | 400000000002 | 400000000004 |
| 814 - | 3174_map | 77773 | 4444 | 400000000003 | 400000000004 |
| 816 - | PC_map | 77771 | 4444 | 400000000001 | 400000000004 |

FIG. 8  800
PRIOR ART

| | 902 | 904 | 906 | 908 | 910 | 911 |
|---|---|---|---|---|---|---|
| | Map Name | Adjacent X.121 Address | Partner X.121 Address | Adjacent MAC Address | Partner MAC Address | Flag |
| 912 - | Host1_map | * | 4444 | (nil) | 400000000004 | 0 |

FIG. 9  900

| | 1004 | 1006 | 1007 | 1008 | 1010 |
|---|---|---|---|---|---|
| | Adjacent X.121 Address | Partner X.121 Address | X.25 LCN | Adjacent MAC Address | Partner MAC Address |
| 1012 - | 77772 | 4444 | 1 | 400000000005 | 400000000004 |

FIG. 10  1000

| Map Name | Adjacent X.121 Address | Partner X.121 Address | Adjacent MAC Address | Partner MAC Address |
|---|---|---|---|---|
| AS400_map | 3745 | 77772 | 400000000004 | 400000000002 |
| 3174_map | 3745 | 77773 | 400000000004 | 400000000003 |
| PC_map | 3745 | 77771 | 400000000004 | 400000000001 |

FIG. 11  1100
PRIOR ART

| Map Name | Adjacent X.121 Address | Partner X.121 Address | Adjacent MAC Address | Partner MAC Address | Flag |
|---|---|---|---|---|---|
| NPSI_host | 3745 | 7777 | 400000000004 | * | 1 |

FIG. 12  1200

| Adjacent X.121 Address | Partner X.121 Address | X.25 LCN | Adjacent MAC Address | Partner MAC Address |
|---|---|---|---|---|
| 3745 | 7777 | 2 | 400000000004 | 400000000002 |

FIG. 13  1300

| Map Name | Adjacent X.121 Address | Partner X.121 Address | Adjacent MAC Address | Partner MAC Address | Flag |
|---|---|---|---|---|---|
| NPSI_host | 3745 | (nil) | 400000000004 | * | 1 |

FIG. 14  1400

| Adjacent X.121 Address | Partner X.121 Address | X.25 LCN | Adjacent MAC Address | Partner MAC Address |
|---|---|---|---|---|
| 3745 | 8888 | 1 | 400000000004 | 400000000002 |

CORRELATING DATA STREAMS OF DIFFERENT PROTOCOLS

PRIORITY

The present application claims priority from the commonly-owned U.S. Provisional Patent Application No. 60/121,661 entitled CORRELATING DATA STREAMS OF DIFFERENT PROTOCOLS, which was filed on Feb. 25, 1999 in the names of Richard Crump, Janet Doong, Okoziem Allen, and Debra Guttormsen, and is hereby incorporated herein by reference in its entirety.

This application is a divisional application claiming priority to application Ser. No. 09/511,847 filed Feb. 24, 2000, now U.S. Pat. No. 6,823,386.

CROSS-REFERENCE TO RELATED APPLICATIONS

The present patent application may be related to the following commonly-owned United States patent applications, which are hereby incorporated herein by reference in their entireties:

U.S. patent application Ser. No. 09/512,576, now U.S. Pat. No. 6,879,993, entitled APPARATUS AND METHOD FOR BINDING A CONNECTION-ORIENTED CLIENT TO A COMMUNICATION CHANNEL, which was filed in the name of Richard Crump on even date herewith;

U.S. patent application Ser. No. 09/511/744, now abandoned entitled MANAGING ADDRESSES IN A COMMUNICATION SYSTEM, which was filed in the names of Richard Crump and Debra Guttormsen on even date herewith; and U.S. patent application Ser. No. 09/511,777, still pending, entitled ENCODING ADDRESSES IN A COMMUNICATION SYSTEM, which was filed in the names of Okoziem Allen and Richard Crump on even date herewith.

FIELD OF THE INVENTION

The invention generally relates to computer networks, and more particularly, to correlating data streams generated for use with different network protocols.

BACKGROUND ART

Computers in a network communicate with each other by using a common communications protocol. Communications protocols can be classified as being either connectionless or connection-oriented.

Connectionless protocols route each data packet in a transmission separately, leaving the packets to make their own way through the network. Data packets within a transmission may take different routes through the network depending on the type of routing used and the volume of data traffic, and may, therefore, arrive at the destination out of sequence. Thus, a sequence number is placed on each data packet by the sending device, and the destination device reassembles the data packets in the correct order. One widely used connectionless protocol is the Internet Protocol (IP). IP uses the Transmission Control Protocol (TCP) or the User Datagram Protocol (UDP) to perform network routing functions and multiplexing of simultaneous logical connections over a single physical connection.

Connection-oriented protocols route data packets by establishing a virtual circuit between the source and destination. One routing decision is made when the connection is established and all data packets in the session follow the same network route. Connection-oriented protocols require that the virtual circuit be opened at the beginning of a transmission by a control packet from the sender that instructs all intervening network devices to establish the circuit routing. Similarly, at the end of a transmission the sender must send a control packet closing the virtual circuit. Data Link Switching (DLSw) is a connection-oriented forwarding mechanism for the IBM Systems Network Architecture (SNA). Qualified Logical Link Control (QLLC) is a protocol that allows SNA data to be transported across connection-oriented X.25 networks. Considerable configuration support is required of network router software to implement QLLC for various Data Link Switching (DLSw) protocol network topologies.

Data routing in a connection-oriented protocol is typically based a Media Access Control (MAC) hardware address that is uniquely associated with each node in the network. A Media Access Control (MAC) layer is generated as a sublayer (along with a Looical Link Control, LLC layer) of a Data Link Control (DLC) layer. MAC addresses sometimes are called burned-in addresses (BIAs) because they are burned into read-only memory (ROM), and are copied into random-access memory (RAM) when the interface card initializes. To complicate matters, the connection-oriented X.25 network also uses X.121 addresses to identify source and destination for message streams.

When a router device is used to interconnect a device in one network, such as a connection-oriented DLSw network, with a device in another network, such as a connection-oriented X.25 network, an address configuration table must be configured in order to map each device to the other. For example, when mapping DLSw devices and X.25 devices, the information in the address configuration table includes source and destination MAC addresses for the DLSw devices, and calling and called X.121 addresses for the X.25 devices. One table entry is made in the address table for each pair of interconnected devices. In order to establish a connection between a DLSw device and an X.25 device, a router device refers to the address configuration table entries to establish a dynamic routing mapping, for example in a dynamic routing table, that is used for the two-way exchange of data messages between the mapped devices. At the end of a communications session, the dynamic routing table entry may be positively deleted by the router, or, may simply "age" out of the dynamic routing table.

Even in a relatively simple network topology, a significant number of address configuration table entries may need to be entered. This may be a tedious, time-consuming process of a network technician with many other pressing tasks to be performed. In addition, entering a large number of addresses by hand is likely to result in a significant number of errors.

SUMMARY OF THE INVENTION

In accordance with one aspect of the invention, a single address configuration table entry maps multiple source devices in a source network to a single destination device in a destination network. This simplifies configuration of the address configuration table. The single address configuration table entry is used when any of the source devices initiates a connection to the destination device. The single address configuration table entry includes a "wildcard" for matching the source address of connection requests that are originated by any of the multiple source devices and destined for the destination device. When a connection is initiated by a source device, certain address/channel information is dynamically allocated in order to map the source device to the destination device. The address/channel information that is dynamically allocated does not need to be pre-configured for each device, which simplifies configuration of the network devices. A dynamic routing table entry is installed in a dynamic routing table in order to map the source device to the destination device using the dynamically allocated address/channel information.

BRIEF DESCRIPTION OF THE DRAWINGS

The present invention will be more readily understood by reference to the following detailed description taken with the accompanying drawings, in which:

FIG. 3 is a block diagram showing an exemplary communication network having multiple DLSw end station devices connecting to one X.25 host device through a router as is known in the art;

FIG. 8 shows an exemplary address configuration table for mapping multiple X.25 end station devices to one DLSw host device as is known in the art;

FIG. 9 shows an exemplary address configuration table for mapping multiple X.25 end station devices to one DLSw host device using a single address configuration table entry in accordance with an embodiment of the present invention;

FIG. 10 shows an exemplary dynamic routing table for mapping an X.25 end station device to a DLSw host device in accordance with an embodiment of the present invention;

FIG. 11 shows an exemplary address configuration table for mapping multiple DLSw end station devices to one X.25 host device as is known in the art;

FIG. 12 shows an exemplary address configuration table for mapping multiple DLSw end station devices to one X.25 host device using a single address configuration table entry in accordance with an embodiment of the present invention in which the X.25 logical channel number is dynamically allocated from a virtual pool of unused X.25 logical channel numbers;

FIG. 13 shows an exemplary dynamic routing table for mapping a DLSw end station device to an X.25 host device using a dynamically allocated X.25 logical channel number in accordance with an embodiment of the present invention;

FIG. 14 shows an exemplary address configuration table for mapping multiple DLSw end station devices to one X.25 host device using a single address configuration table entry in accordance with an embodiment of the present invention in which the Partner X.121 Address is dynamically allocated from an X.121 address pool;

FIG. 15 shows an exemplary dynamic routing table for mapping a DLSw end station device to an X.25 host device using a dynamically allocated Partner X.121 Address in accordance with an embodiment of the present invention.

DETAILED DESCRIPTION OF SPECIFIC EMBODIMENTS

Figure 1:
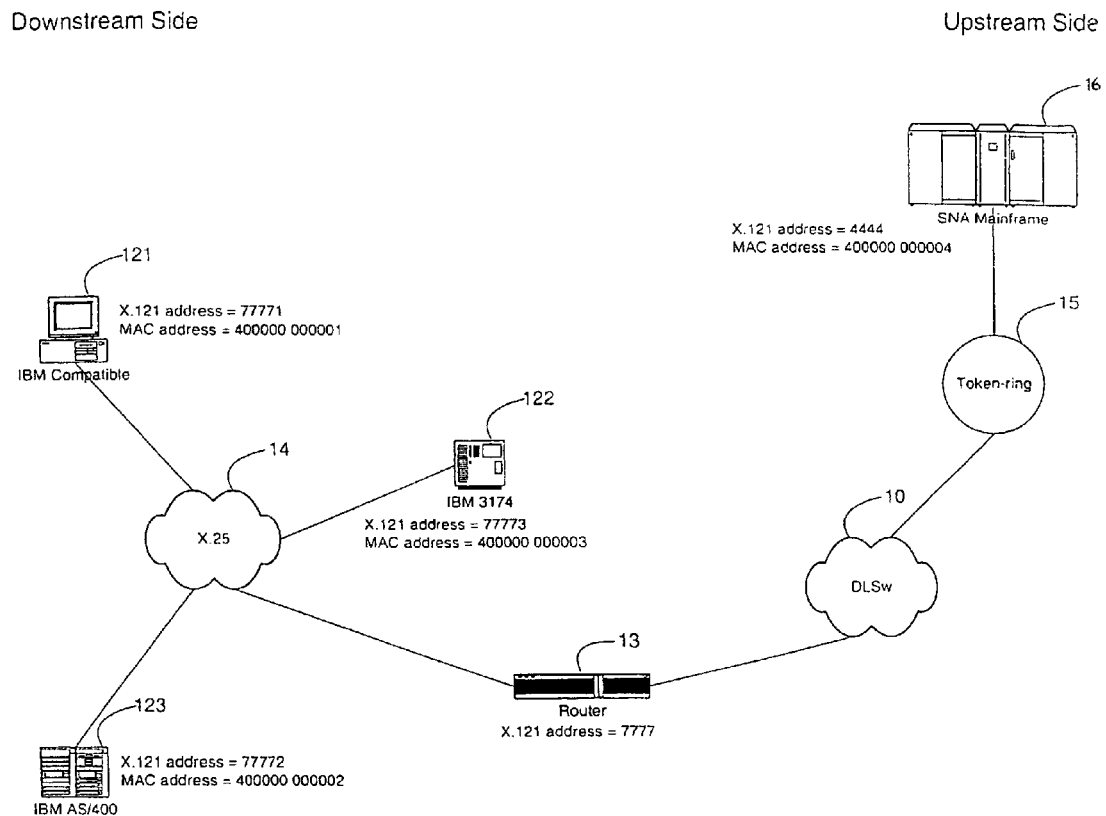
FIG. 1 is a block diagram showing an exemplary communication network having multiple X.25 end station devices connecting to one DLSw host device through a router as is known in the art.

In an exemplary embodiment of the present invention, a single address configuration table entry maps multiple source devices in a source network to a single destination device in a destination network. The single address configuration table entry is used when any of the source devices initiates a connection to the destination device. The single address configuration table entry includes a "wildcard" for matching the source address of connection requests that are originated by any of the multiple source devices and destined for the destination device. Because the "wildcard" may match multiple source addresses, the single address configuration table entry does not represent a one-to-one mapping of a source device from the source network to a destination device in the destination network. Therefore, in order to establish a connection from a source device in the source network to a destination device in the destination network using the single address configuration table entry, certain address/channel information is dynamically allocated at the time the connection is established, and a dynamic routing table entry is installed in a dynamic routing table in order to map the source device to the destination device using the dynamically allocated address/channel information. In this way, a router or other intermediate network device is able to maintain one address configuration table entry per destination device rather than one address configuration table entry per source device, as in the prior art. Furthermore, the address/channel information that is dynamically allocated does not need to be pre-configured for each device, which simplifies configuration of the network devices. Such an arrangement greatly reduces the complexity of configuring addressing information.

Various aspects of the present invention can be demonstrated by example with reference to a communication system having a connection-oriented X.25 network that is interconnected with a connection-oriented DLSw network through a router or other intermediate network device. In a first exemplary embodiment, multiple X.25 clients in the (source) X.25 network initiate connections to a single DLSw host in the (destination) DLSw network. In a second exemplary embodiment, multiple DLSw clients in the (source) DLSw network initiate connections to a single X.25 host in the (destination) X.25 network.

Within such a communication system, each client/host device is associated with an X.121 address for the X.25 network as well as a MAC address for the DLSw network.

Address mapping information must be configured in order to enable connection establishment between the X.25 devices in the X.25 network and the DLSw devices in the DLSw network. The router stores the address mapping information in the address configuration table. The router uses the address mapping information in the address configuration table for establishing connections.

In an embodiment of the present invention, the address mapping information is configured differently depending on whether connections are initiated from the X.25 network or from the DLSw network. When connections are initiated from the X.25 network, each address configuration table entry maps one or more (source) X.25 devices in the (source) X.25 network to a single (destination) DLSw device in the (destination) DLSw network. When connections are initiated from the DLSw network, each address configuration table entry maps one or more (source) DLSw devices in the (source) DLSw network to a single (destination) X.25 device in the (destination) X.25 network.

Because the designations "source" and "destination" are relative to the network from which the connections are initiated, it is convenient to introduce the terms "adjacent" and "partner" to describe addresses that are associated with an X.25 device and a DLSw device, respectively. Thus, an address configuration table entry includes, among other things, an Adjacent X.121 Address field, a Partner X.121 Address field, an Adjacent MAC Address field, a Partner MAC Address field, and a Flag field. The Flag field indicates whether the Partner MAC Address field contains an actual MAC address or a regular expression ("wildcard").

When connections are initiated from the X.25 network, the Adjacent X.121 Address field is configured as a "wildcard" using a regular expression in order to match one or more (source) X.25 device addresses. An exemplary embodiment of the present invention utilizes the regular expression ".*" (i.e., the two-character string consisting of a period followed by an asterisk) as the "wildcard" in order to match any address, as described in the related patent application entitled ENCODING ADDRESSES IN A COMMUNICATION SYSTEM, which was incorporated by reference above. The Adjacent MAC Address field is left blank (nil). When a connection is established, the Adjacent MAC Address for the connection is dynamically allocated from a predetermined MAC address pool.

When connections are initiated from the DLSw network, the Partner MAC Address field is configured as a "wildcard" using a regular expression in order to match one or more (source) DLSw device addresses. An exemplary embodiment of the present invention utilizes the regular expression ".*" (i.e., the two-character-string consisting of a period followed by an asterisk) as the "wildcard" in order to match any address. as described in the related patent application entitled ENCODING ADDRESSES IN A COMMUNICATION SYSTEM, which was incorporated by reference above. The Partner X.121 Address field may be configured to be the X.121 address associated with an implied source device (such as the router), in which case an X.25 logical channel number (LCN) is dynamically allocated for the connection when the connection is established, or the Partner X.121 Address field may be left blank (nil), in which case the Partner X.121 Address is dynamically allocated for the connection when the connection is established. Either the X.25 LCN or the Partner X.121 Address is dynamically allocated because each X.25 session is required to have a unique LCN/X.121 pair in order to differentiate the various X.25 sessions. In the former case, the same Partner X.121 Address (i.e., the X.121 address associated with the implied source device) is used for each X.25 session, and therefore a different X.25 LCN is used for each X.25 session in order to distinguish the various X.25 sessions. In the latter case, the same X.25 LCN is used for each X.25 session, and therefore a different Partner X.121 Address is used for each X.25 session in order to distinguish the various X.25 sessions.

Once a connection is established, the router installs a dynamic routing table entry in the dynamic routing table. The dynamic routing table entry includes, among other things, an Adjacent X.121 Address field, a Partner X.121 Address field, an actual or implied X.25 LCN field, an Adjacent MAC Address field, and a Partner MAC Address field. The dynamic routing table entry includes addressing information for mapping a single X.25 device to a single DLSw device including any dynamically allocated address/channel information. The dynamic routing table entry does not include any "wildcard" or "nil" values. The router uses the dynamic routing table entry for forwarding packets between the X.25 device and the DLSw device, irrespective of which side initiated the connection.

Specifically, when a connection is initiated by an X.25 device, the X.25 device specifies a calling X.121 address corresponding to the source X.25 device and a called X.121 address corresponding to the destination DLSw device. The router searches the address configuration table for an address configuration table entry having the Adjacent X.121 Address field matching the calling X.121 address (via a "wildcard") and the Partner X.121 Address field equal to the called X.121 address. Upon finding such an address configuration table entry, the router obtains the Partner MAC Address from the address configuration table entry, and allocates an Adjacent MAC Address from the predetermined MAC address pool. The router then attempts to establish a connection to the destination DLSw device using the allocated Adjacent MAC Address as the source MAC address and the Partner MAC Address as the destination MAC address. Assuming the router is able to establish the connection to the destination DLSw device, the router installs a dynamic routing table entry in the dynamic routing table. Within the dynamic routing table entry, the Adjacent X.121 Address field is equal to the calling X.121 address specified by the source X.25 device, the Partner X.121 Address field is equal to the called X.121 address specified by the source X.25 device, the X.25 LCN field is equal to the X.25 LCN associated with the connection (which, in a preferred embodiment. defaults to 1), the Adjacent MAC Address field is equal to the MAC address that the router allocated from the MAC address pool, and the Partner MAC Address field is equal to the Partner MAC Address field from the address configuration table entry.

On the other hand, when a connection is initiated by a DLSw device, the DLSw device specifies a source MAC address corresponding to the source DLSw device and a destination MAC address corresponding to the destination X.25 device. The router searches the address configuration table for an address configuration table entry having the Partner MAC Address field matching the source MAC address (via a "wildcard) and the Adjacent MAC Address field equal to the destination MAC address. Upon finding such an address configuration table entry, the router obtains the Adjacent X.121 Address from the address configuration table entry, and determines from the Partner X.121 Address field whether to dynamically allocate an X.25 LCN for the connection or to dynamically allocate a Partner X.121 Address for the connection. If the Partner X.121 Address field includes a usable X.121 address, then the router dynamically allocates an X.25 LCN from a "virtual pool" of unused X.25 LCNs. If the Partner X.121 Address field is "nil," then the router dynamically allocates a Partner X.121 Address from a predetermined pool of X.121 addresses. In either case, the router then attempts to establish a connection to the destination X.25 device using the Partner X.121 Address as the calling X.121 address and the Adjacent X.121 Address as the called X.121 address. Assuming the router is able to establish the connection to the destination X.25 device, the router installs a dynamic routing table entry in the dynamic routing table. If the router dynamically allocated the X.25 LCN. then the Adjacent X.121 Address field is equal to the Adjacent X.121 Address field from the address configuration table entry, the Partner X.121 Address field is equal to the Partner X.121 Address field from the address configuration table entry, the X.25 LCN field is equal to the allocated X.25 LCN, the Adjacent MAC Address field is equal to the destination MAC address specified by the source DLSw device, and the Partner MAC Address field is equal to the source MAC address specified by the source DLSw device. If the router dynamically allocated the Partner X.121 Address, then the Adjacent X.121 Address field is equal to the Adjacent X.121 Address field from the address configuration table entry, the Partner X.121 Address field is equal to the allocated Partner X.121 Address, the X.25 LCN field is equal to a predetermined X.25 LCN, the Adjacent MAC Address field is equal to the destination MAC address specified by the source DLSw device, and the Partner MAC Address field is equal to the source MAC address specified by the source DLSw device.

Initiating a Connection from the X.25 Network

FIG. 1 shows an exemplary prior art communication network 100 having multiple X.25 end station devices initiating connections to one DLSw host device. More specifically, a DLSw network 10 is connected to downstream QLLC compatible X.25 devices 121, 122, and 123 via an X.25 network 14 that includes the router device 13. The DLSw network 10 is also connected via a token ring network 15 to upstream host LLC device SNA mainframe 16. The personal computer 121 is a QLLC X.25 device having an X.121 address of 77771 and a MAC address of 400000000001. The IBM 3174 122 is a QLLC X.25 device having an X.121 address of 77773 and a MAC address of 400000000003. The IBM AS/400 123 is a QLLC X.25 device having an X.121 address of 77772 and a MAC address of 400000000002. The host SNA mainframe 16 is an LLC protocol DLSw device having an X.121 address of 4444 and a MAC address of 400000000004. The router 13 has an X.121 address of 7777.

In order for the X.25 devices (121, 122, 123) to connect to the host SNA mainframe 16, address mapping information must be configured to map each X.25 device (121, 122, 123) to the host SNA mainframe 16. A complete set of address mapping information is configured for each pair of interconnected devices. This address mapping information includes the X.121 addresses and MAC addresses for each pair of interconnected devices. Thus, in a topology where many X.25 client devices need access to a single DLSw host device, address mapping information is configured for each X.25 client device.

FIG. 8 shows an exemplary prior art address configuration table 800 for use in the router device 13 in the network illustrated in FIG. 1. The address configuration table 800 includes three address configuration table entries (812, 814, 816), one for each X.25 device (121, 122, 123). Each address configuration table entry (812, 814, 816) includes a Map Name field 802, an Adjacent X.121 Address field 804, a Partner X.121 Address field 804, an Adjacent MAC Address field 808, and a Partner MAC Address field 810. The Map Name field 802 is used to name a specific address configuration table entry. The Adjacent X.121 Address field 804 indicates the X.121 address of the X.25 client device. The Partner X.121 Address field 804 indicates the X.121 address of the DISw host device. The Adjacent MAC Address field 808 indicates the MAC address of the X.25 client device. The Partner MAC Address field 810 indicates the MAC address of the DLSw host device.

The address configuration table 800 shows three exemplary address configuration table entries, specifically address configuration table entries 812, 814, and 816. Address configuration table entry 812, which has a Map Name AS400_map, corresponds to the connection from the IBM AS/400 123 to the SNA mainframe 16, and thus includes Adjacent X.121 Address 77772, Partner X.121 Address 4444, Adjacent MAC Address 400000000002, and Partner MAC Address 400000000004. Address configuration table entry 814, which has a Map Name 3174_map, corresponds to the connection from the IBM 3174 122 to the SNA mainframe 16, and thus includes Adjacent X.121 Address 77773, Partner X.121 Address 4444, Adjacent MAC Address 400000000003, and Partner MAC Address 400000000004. Address configuration table entry 816, which has a Map Name PC_map, corresponds to the connection from the personal computer workstation PC 122 to the SNA mainframe 16, and thus includes Adjacent X.121 Address 77771, Partner X.121 Address 4444, Adjacent MAC Address 400000000001, and Partner MAC Address 400000000004.

When, for example, the AS/400 123 initiates a connection to the SNA mainframe 16, the AS/400 123 generates a connection request including, among other things, a calling X.121 address equal to the X.121 address of the AS/400 123 (77772) and a called X.-121 address equal to the X.121 address of the SNA mainframe 16 (4444). When the router device 13 receives this connection request from the AS/400 123, the router device 13 searches the address configuration table 800 for an address configuration table entry having an Adjacent X.121 Address 804 matching the calling X.121 address of 77772 and a Partner X.121 Address 806 matching the called X.121 address of 4444. In this example, the router device 13 finds the address configuration table entry 812.

Upon finding the address configuration table entry 812, router device 13 obtains the corresponding Adjacent MAC Address 808 of 400000000002 and the corresponding Partner MAC Address 810 of 400000000004 from the address configuration table entry 812, and attempts to connect to the SNA mainframe 16 using a source MAC address equal to the Adjacent MAC Address 808 of 400000000002 and a destination MAC address equal to the Partner MAC Address 810 of 400000000004.

Figure 2:
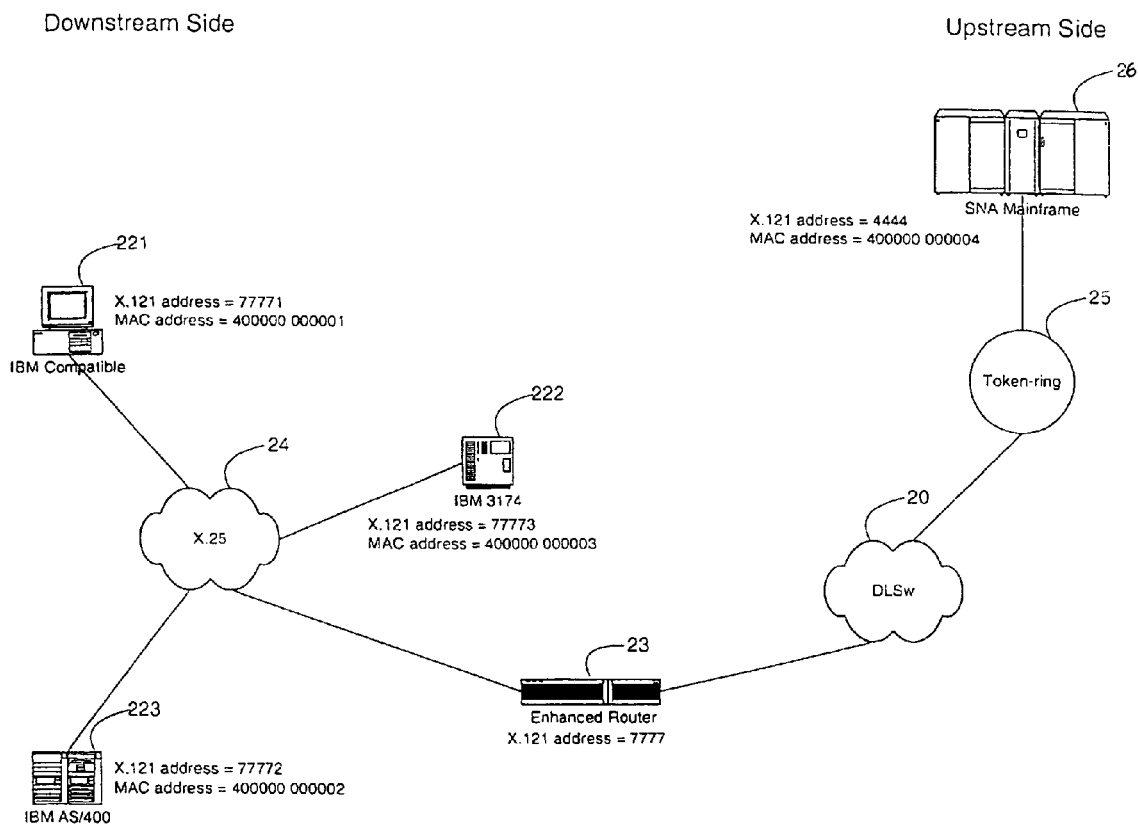
FIG. 2 is a block diagram showing an exemplary communication network having multiple X.25 end station devices connecting to one DLSw host device through an enhanced router in accordance with an embodiment of the present invention.

The communication network 200 shown in FIG. 2 is similar to the communication network 100 shown in FIG. 1, but uses an enhanced router device 23 having an enhanced address configuration table for mapping multiple X.25 devices to a single DLSw device using a single address configuration table entry. More specifically, a DLSw network 20 is connected to downstream QLLC compatible X.25 devices 221, 222, and 223 via an X.25 network 24 that includes the enhanced router device 23. The DLSw network 20 is also connected via a token ring network 25 to upstream host LLC device SNA mainframe 26. In the network depicted in FIG. 2. the personal computer 221 is a QLLC X.25 device having an X.121 address of 77771. The IBM 3174 222 is a QLLC X.25 device having an X.121 address of 77773. The IBM AS/400 223 is a QLLC X.25 device having an X.121 address of 77772. The X.25 devices (221, 222, 223) may be assigned MAC addresses, as in the prior art embodiment shown in FIG. 1, although the X.25 devices (221, 222, 223) need not be assigned such MAC addresses, since the enhanced router 23 dynamically assigns MAC addresses for the X.25 devices (221, 222, 223) from a MAC address pool. The host SNA mainframe 26 is an LLC protocol DLSW device havino an X.121 address of 4444 and a MAC address of 400000000004. The enhanced router 23 has an X.121 address of 7777.

In order for the X.25 devices (221, 222, 223) to connect to the host SNA mainframe 26, a single address configuration table entry that maps all X.25 devices (221, 222, 223) to the host SNA mainframe 26 is installed in the address configuration table. The single address configuration table entry includes a "wildcard" for matching all X.25 device addresses, and includes the X.121 address and the MAC address associated with the host SNA mainframe 26. Thus, address mapping information is configured for the single DLSw host device rather than for each X.25 client device.

FIG. 9 shows an exemplary address configuration table 900 for use in the enhanced router device 23 in the network illustrated in FIG. 2. The address configuration table 900 includes a single address configuration table entry 912 for mapping the X.25 devices (221, 222, 223) to the host SNA mainframe 26. The address configuration table entry 912 includes a Map Name field 902, an Adjacent X.121 Address field 904, a Partner X.121 Address field 906, an Adjacent MAC Address field 908, a Partner MAC Address field 910, and a Flag field 911. The Map Name field 902 includes an address configuration table entry name, which, in this example, is "Host1_map." The Adjacent X.121 Address field 904 includes a "wildcard" matching all X.25 device addresses. The Partner X.121 Address field 906 includes the X.121 address 4444 that is associated with the host SNA mainframe 26. The Adjacent MAC Address field 908 is "nil," which indicates that the source MAC address is to be allocated from the MAC address pool. The Partner MAC Address field 910 includes the MAC address 400000000004 that is associated with the host SNA mainframe 26. The Flag field 911 is zero, which indicates that there is no "wildcard" in the Partner MAC Address field 910.

When, for example, the AS/400 223 initiates a connection to the SNA mainframe 26, the AS/400 223 generates a connection request including, among other things, a calling X.121 address equal to the X.121 address of the AS/400 223 (77772) and a called X.121 address equal to the X.121 address of the SNA mainframe 26 (4444). When the enhanced router device 23 receives this connection request from the AS/400 223, the enhanced router device 23 searches the address configuration table 900 for an address configuration table entry having an Adjacent X.121 Address 904 matching the calling X.121 address of 77772 and a Partner X.121 Address 906 equal to the called X.121 address of 4444. In this example, the enhanced router- device 23 finds the address configuration table entry 912.

Upon finding the address configuration table entry 912, enhanced router device 23 obtains the corresponding Partner MAC Address 910 of 400000000004 from the address configuration table entry 912, but is unable to obtain an Adjacent MAC Address from the address configuration table entry 912 since the Adjacent MAC Address field 908 is "nil." Therefore, the enhanced router device 23 allocates the Adjacent MAC Address from a MAC address pool. For example, assume that the enhanced router device 23 allocates the MAC address 400000000005 from a MAC address pool containing the MAC addresses 400000000005, 400000000006, and 400000000007. The enhanced router device 23 then attempts to connect to the host SNA mainframe 26 using a source MAC address equal to the allocated Adjacent MAC Address of 400000000005 and a destination MAC address equal to the Partner MAC Address 910 of 400000000004. If the enhanced router device 23 is able to establish the connection to the host SNA mainframe 26, then the enhanced router device 23 installs a dynamic routing table entry in the dynamic routing table mapping the AS/400 223 to the host SNA mainframe 26.

FIG. 10 shows an exemplary dynamic routing table 1000 including a dynamic routing table entry 1012 mapping the AS/400 223 to the host SNA mainframe 26. The dynamic routing table entry 1012 includes an Adjacent X.121 Address field 1004 equal to the calling X.121 address of 77772, a Partner X.121 Address field 1006 equal to the called X.121 address of 4444, an X.25 LCN field 1007 equal to a predetermined X.25 LCN of 1, an Adjacent MAC Address field 1008 equal to the allocated Adjacent MAC Address of 400000000005, and a Partner MAC Address field 1010 equal to the Partner MAC Address of 400000000004. The enhanced router device 23 uses the dynamic routing table entry 1012 to translate between X.121 addresses and MAC address for communication between the AS/400 223 and the host SNA mainframe 26. For example, when the enhanced router device 23 receives an X.25 packet from the AS/400 223 including a calling X.121 address of 77772 and a called X.121 address of 4444, the enhanced router device 23 uses the dynamic routing table entry 1012 to translate the calling X.121 address of 77772 into a source MAC address of 400000000005 and to translate the called X.121 address of 4444 into a destination MAC address of 400000000004. Similarly, when the enhanced router device 23 receives a DLSw packet from the host SNA mainframe 26 including a source MAC address of 400000000004 and a destination MAC address of 400000000005, the enhanced router device 23 uses the dynamic routing table entry 1012 to translate the source MAC address of 400000000004 into a calling X.121 address of 4444 and to translate the destination MAC address of 400000000005 into a called X.121 address of 77772.

Figure 6:
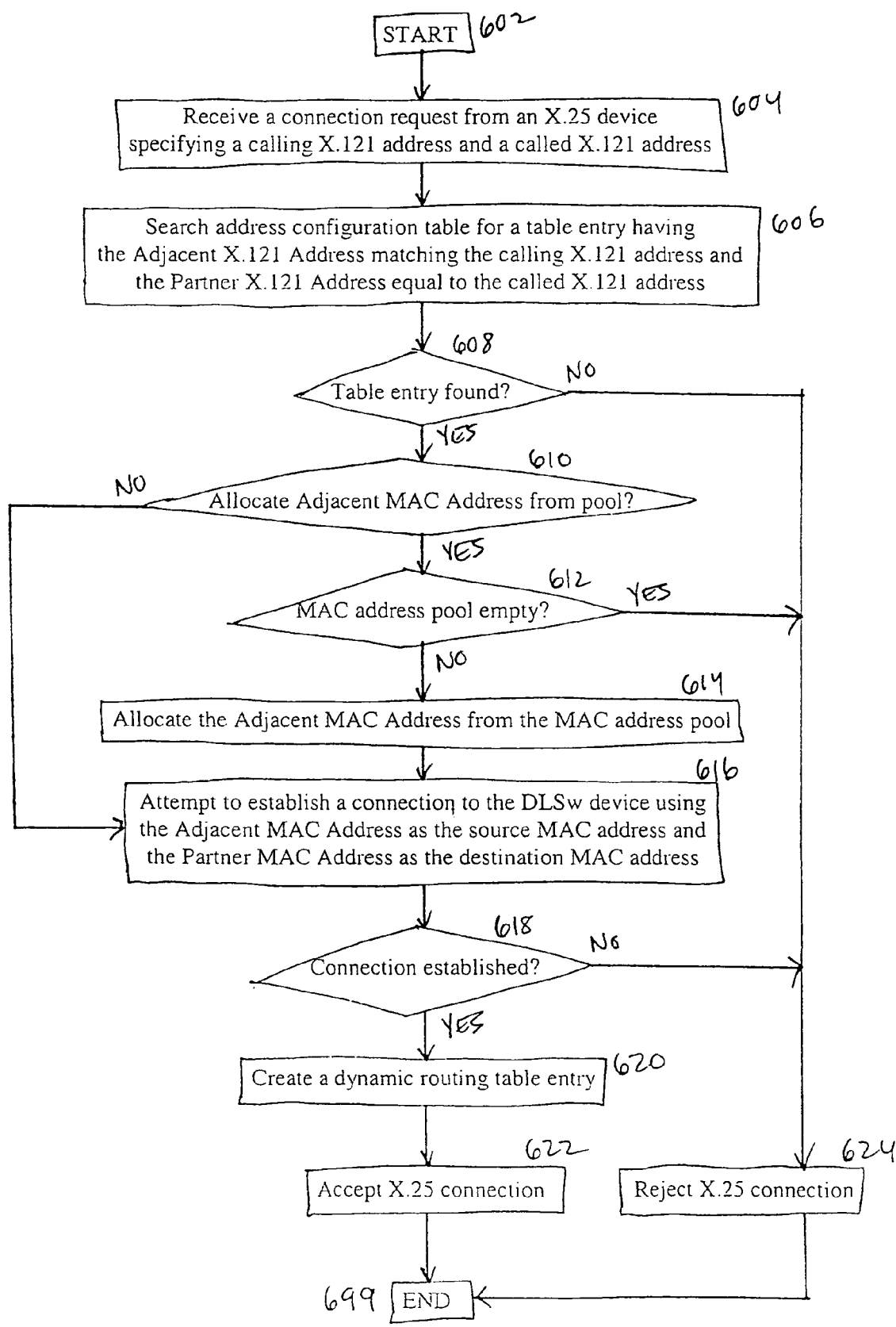
FIG. 6 is a logic flow diagram showing exemplary logic for establishing a connection from an X.25 end station device to a DLSw host device in accordance with an embodiment of the present invention.

FIG. 6 is a logic flow diagram showing exemplary logic 600 for establishing a connection from an X.25 device to a DLSw device by the enhanced router device 23. Beginning at step 602, and upon receiving a connection request from an X.25 device specifying a calling X.121 address and a called X.121 address, in step 604, the logic proceeds to search in the address configuration table for an address configuration table entry having the Adjacent X.121 Address matching the calling X.121 address and the Partner X.121 Address equal to the called X.121 address, in step 606. If the logic fails to find such an address configuration table entry (NO in step 608), then the logic rejects the X.25 connection request, in step 624. However, assuming the logic finds such an address configuration table entry (YES in step 608), then the logic decides whether to allocate the Adjacent MAC Address from the MAC address pool, in step 610. For example, the logic may decide to allocate the Adjacent MAC Address from the MAC address pool based upon a "wildcard" in the Adjacent X.121 Address field or a "nil" value in the Adjacent MAC Address field of the address configuration table entry. If the logic decides not to allocate the Adjacent MAC Address from the MAC address pool (NO in step 610), then the logic proceeds to step 616 and uses the address configured in the Adjacent MAC Address field. If the logic decides to allocate the Adjacent MAC Address from the MAC address pool (YES in step 610), then the logic searches the MAC address pool for an available MAC address, in step 612. If the MAC address pool is "empty" such that there is no available MAC address (YES in step 612), then the logic rejects the X.25 connection request, in step 624. If the MAC address pool is not "empty," then the logic allocates the Adjacent MAC Address from the MAC address pool, in step 614, and proceeds to step 616.

In step 616, the logic attempts to establish a connection to the destination DLSw device using the Adjacent MAC Address as the source MAC address and the Partner MAC Address as the destination MAC address. It should be noted that the Adjacent MAC Address may be obtained from the address configuration table entry or from the MAC address pool. In any case, if the logic is unable to establish the connection to the destination DLSw device (NO in step 618), then the logic rejects the X.25 connection request, in step 624. If the logic is able to establish the connection to the destination DLSw device (YES in step 618), then the logic creates a dynamic routing table entry in the dynamic routing table, in step 620, and accepts the X.25 connection request, in step 622. The dynamic routing table entry includes an Adjacent X.121 Address field equal to the calling X.121 address, a Partner X.121 Address field equal to the called X.121 address, an X.25 LCN field equal to a predetermined X.25 LCN, an Adjacent MAC Address field equal to either the Adjacent MAC Address from the address configuration table entry or the MAC address allocated from the MAC address pool, and a Partner MAC Address field equal to the Partner MAC Address from the address configuration table entry.

Initiating a Connection from the DLSw Network

FIG. 3 shows an exemplary prior art communication network 300 having multiple DLSw end station devices initiating connections to one X.25 host device. More specifically, a DLSw network 30 is connected to an upstream QLLC X.25 device host 32 via an X.25 network 34 that includes the router device 33. The DLSw network 30 is also connected via a token ring network 35 to downstream LLC-attached SNA end stations 361, 362, and 363. The personal computer 361 is an LLC-attached DLSw device having a MAC address of 400000000001 and an X.121 address of 77771. The IBM 3174 362 is an LLC-attached DLSw device having a MAC address of 400000000003 and an X.121 address of 77773. The IBM AS/400 363 is an LLC-attached DLSw device having a MAC address of 400000000002 and an X.121 address of 77772. The host SNA mainframe 32 is a QLLC X.25 device having a MAC address of 400000000004 and an X.121 address of 3745. The router 33 has an X.121 address of 7777.

In order for the DLSw devices (361, 362, 363) to connect to the host SNA mainframe 32, address mapping information must be configured to map each DLSw device (361, 362, 363) to the host SNA mainframe 32. A complete set of address mapping information is configured for each pair of interconnected devices. This address mapping information includes the X.121 addresses and MAC addresses for each pair of interconnected devices. Thus, in a topology where many DLSw devices need access to a single X.25 host device, address mapping information is configured for each DLSw client device.

FIG. 11 shows an exemplary prior art QLLC address configuration mapping table 1100 for use in the router device 33 in the network illustrated in FIG. 3. The address configuration table 1100 includes three address configuration table entries (1112, 1114, 1116), one for each DLSw device (361, 362, 363). Each address configuration table entry (1112, 1114, 1116) includes a Map Name field 1102, an Adjacent X.121 Address field 1104, a Partner X.121 Address field 1106, an Adjacent MAC Address field 1108, and a Partner MAC Address field 1110. The Map Name field 1102 is used to name a specific address configuration table entry. The Adjacent X.121 Address 1104 indicates the X.121 address of the X.25 host device. The Partner X.121 Address 1106 indicates the X.121 address of the DLSw client device. The Adjacent MAC Address 1108 indicates the MAC address of the X.25 host device. The Partner MAC Address 1110 indicates the MAC address of the DLSw client device.

The address configuration table 1100 shows three exemplary address configuration table entries, specifically address configuration table entries 1112, 1114, and 1116. Address configuration table entry 1112, which has a Map Name AS400_map, corresponds to the connection from the IBM AS/400 363 to the SNA mainframe 32, and thus includes Adjacent X.121 Address 3745, Partner X.121 Address 77772, Adjacent MAC Address 400000000004, and Partner MAC Address 400000000002. Address configuration table entry 1114, which has a Map Name 3174_map, corresponds to the connection from the IBM 3174 362 to the SNA mainframe 32, and thus includes Adjacent X.121 Address 3745, Partner X.121 Address 77773, Adjacent MAC Address 400000000004, and Partner MAC Address 400000000003. Address configuration table entry 1116, which has a Map Name PC map, corresponds to the connection from the personal computer workstation PC 361 to the SNA mainframe 32, and thus includes Adjacent X.121 Address 3745, Partner X.121 Address 77771, Adjacent MAC Address 400000000004, and Partner MAC Address 400000000001.

When, for example, the AS/400 363 initiates a connection to the SNA mainframe 32, the AS/400 363 generates a connection request including, among other things, a source MAC address equal to the MAC address of the AS/400 363 (400000000002) and a destination MAC address equal to the MAC address of the SNA mainframe 32 (400000000004). When the router device 33 receives this connection request from the AS/400 363, the router device 33 searches the address configuration table 1100 for an address configuration table entry having a Partner MAC Address 1110 matching the source MAC address of 400000000002 and an Adjacent MAC Address 1108 matching the destination MAC address of 400000000004. In this example, the router device 33 finds the address configuration table entry 1112.

Upon finding the table entry 1112, router device 33 obtains the corresponding Partner X.121 Address 1106 of 77772 and the corresponding Adjacent X.121 Address 1104 of 3745 from the address configuration table entry 1112, and attempts to connect to the SNA mainframe 32 using a calling X.121 address equal to the Partner X.121 Address 1106 of 77772 and a called X.121 address equal to the Adjacent X.121 Address 1104 of 3745.

Figure 4:
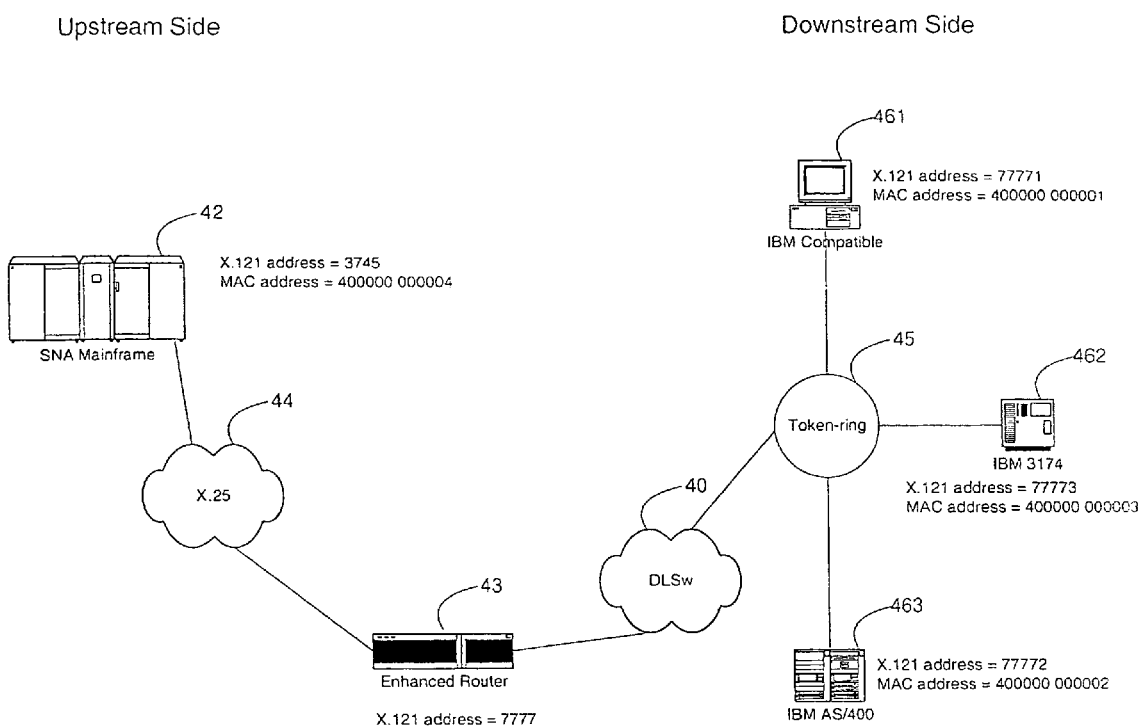
FIG. 4 is a block diagram showing an exemplary communication network having multiple DLSw end station devices connecting to one X.25 host device through an enhanced router in accordance with an embodiment of the present invention.

The communication network 400 shown in FIG. 4 is similar to the communication network 300 shown in FIG. 3, but uses an enhanced router device 43 having an enhanced address configuration table for mapping multiple DLSw devices to a single X.25 device using a single address configuration table entry. More specifically, a DLSw network 40 is connected to an upstream QLLC X.25 device host 42 via an X.25 network 44 that includes the enhanced router device 43. The DLSw network 40 is also connected via a token ring network 45 to downstream LLC-attached SNA end stations 461, 462, and 463. The personal computer 461 is an LLC-attached DLSw device having a MAC address of 400000000001. The IBM 3174 462 is an LLC-attached DLSw device having a MAC address of 400000000003. The IBM AS/400 463 is an LLC-attached DLSw device having a MAC address of 400000000002. The DLSw devices (461, 462, 463) may be assigned X.121 addresses, as in the prior art embodiment shown in FIG. 3, although the DLSw devices (461, 462, 463) need not be assigned such X.121 addresses, since the enhanced router 43 either dynamically assigns X.121 addresses for the DLSw devices (461, 462, 463) from an X.121 address pool or uses the X.121 address of the enhanced router 43. The host SNA mainframe 42 is a QLLC X.25 device having a MAC address of 400000000004 and an X.121 address of 3745. The enhanced router 43 has an X.121 address of 7777.

In order for the DLSw devices (461, 462, 463) to connect to the host SNA mainframe 42, a single address configuration table entry that maps all DLSw devices (461, 462, 463) to the host SNA mainframe 42 is installed in the address configuration table. The single address configuration table entry includes a "wildcard" for matching all DLSw device addresses, and includes the X.121 address and the MAC address associated with the host SNA mainframe 42. Thus, address mapping information is configured for the single X.25 host device rather than for each DLSw client device.

In one embodiment of the invention, the enhanced router device 43 uses the same Partner X.121 Address for all connections and dynamically allocates a different X.25 LCN for each connection. In another embodiment of the invention, the enhanced router device 43 uses the same X.25 LCN for all connections and dynamically allocates a different Partner X.121 Address for each connection. An example of each scheme is described below.

Dynamically Allocate X.25 LCN

FIG. 12 shows an exemplary address configuration table 1200 for use in the enhanced router device 43 when the enhanced router device 43 dynamically allocates the X.25 LCNs. The address configuration table 1200 includes a single address configuration table entry 1212 for mapping the DLSw devices (461, 462, 463) to the host SNA mainframe 42. The address configuration table entry 1212 includes a Map Name field 1202, an Adjacent X.121 Address field 1204, a Partner X.121 Address field 1206, an Adjacent MAC Address field 1208, a Partner MAC Address field 1210, and a Flag field 1211. The Map Name field 1202 includes an address configuration table entry name, which, in this example, is "NPSI_host." The Adjacent X.121 Address field 1204 includes the X.121 address 3745 that is associated with the host SNA mainframe 42. The Partner X.121 Address field 1206 includes the X.121 address 7777 that is associated with the enhanced router 43. The Adjacent MAC Address field 1208 includes the MAC address 400000000004 that is associated with the host SNA mainframe 42. The Partner MAC Address field 1210 includes a "wildcard" matching all DLSw device addresses. The Flag field 1211 is equal to one, which indicates that there is a "wildcard" in the Partner MAC Address field 1210.

When, for example, the AS/400 463 initiates a connection to the SNA mainframe 42, the AS/400 463 generates a connection request including, among other things, a source MAC address equal to the MAC address of the AS/400 463 (400000000002) and a destination MAC address equal to the MAC address of the SNA mainframe 42 (400000000004). When the enhanced router device 43 receives this connection request from the AS/400 463, the enhanced router device 43 searches the address configuration table 1200 for an address configuration table entry having a Partner MAC Address 1210 matching the source MAC address of 400000000002 and an Adjacent MAC Address 1208 matching the destination MAC address of 400000000004. In this example, the enhanced router device 43 finds the address configuration table entry 1212.

Upon finding the table entry 1212, enhanced router device 43 obtains the corresponding Partner X.121 Address 1206 of 7777 and the corresponding Adjacent X.121 Address 1204 of 3745 from the address configuration table entry 1212, and dynamically allocates an X.25 LCN from among the "virtual pool" of unused X.25 LCNs. For example, assume that the enhanced router device 43 allocates the X.25 LCN 2. The enhanced router device 43 then attempts to connect to the SNA mainframe 42 over the dynamically allocated X.25 LCN 2 using a calling X.121 address equal to the Partner X.121 Address 1406 of 7777 and a called X.121 address equal to the Adjacent X.121 Address 1404 of 3745. If the enhanced router device 43 is able to establish the connection to the host SNA mainframe 42, then the enhanced router device 43 installs a dynamic routing table entry in the dynamic routing table mapping the AS/400 463 to the host SNA mainframe 42.

FIG. 13 shows an exemplary dynamic routing table 1300 including a dynamic routing table entry 1312 mapping the AS/400 463 to the host SNA mainframe 42. The dynamic routing table entry 1312 includes an Adjacent X.121 Address field 1304 equal to the Adjacent X.121 Address of 3745, a Partner X.121 Address field 1306 equal to the Partner X.121 Address of 7777, an X.25 LCN field 1307 equal to the dynamically allocated X.25 LCN of 2, an Adjacent MAC Address field 1308 equal to the Adjacent MAC Address of 400000000004, and a Partner MAC Address field 1310 equal to the source MAC address of 400000000002. The enhanced router device 43 uses the dynamic routing table entry 1312 to translate between X.121 addresses and MAC address for communication between the AS/400 463 and the host SNA mainframe 42. For example, when the enhanced router device 43 receives an X.25 packet from the host SNA mainframe 42 including a calling X.121 address of 3745 and a called X.121 address of 7777 over X.25 LCN 2, the enhanced router device 43 uses the dynamic routing table entry 1312 to translate the calling X.121 address of 3745 into a source MAC address of 400000000004 and to translate the called X.121 address of 7777 into a destination MAC address of 400000000002. Similarly, when the enhanced router device 43 receives a DLSw packet from the AS/400 463 including a source MAC address of 400000000002 and a destination MAC address of 400000000004, the enhanced router device 43 uses the dynamic routing table entry 1312 to obtain the X.25 LCN of 2 and to translate the source MAC address of 400000000002 into a calling X.121 address of 7777 and the destination MAC address of 400000000004 into a called X.121 address of 3745.

Figure 7:
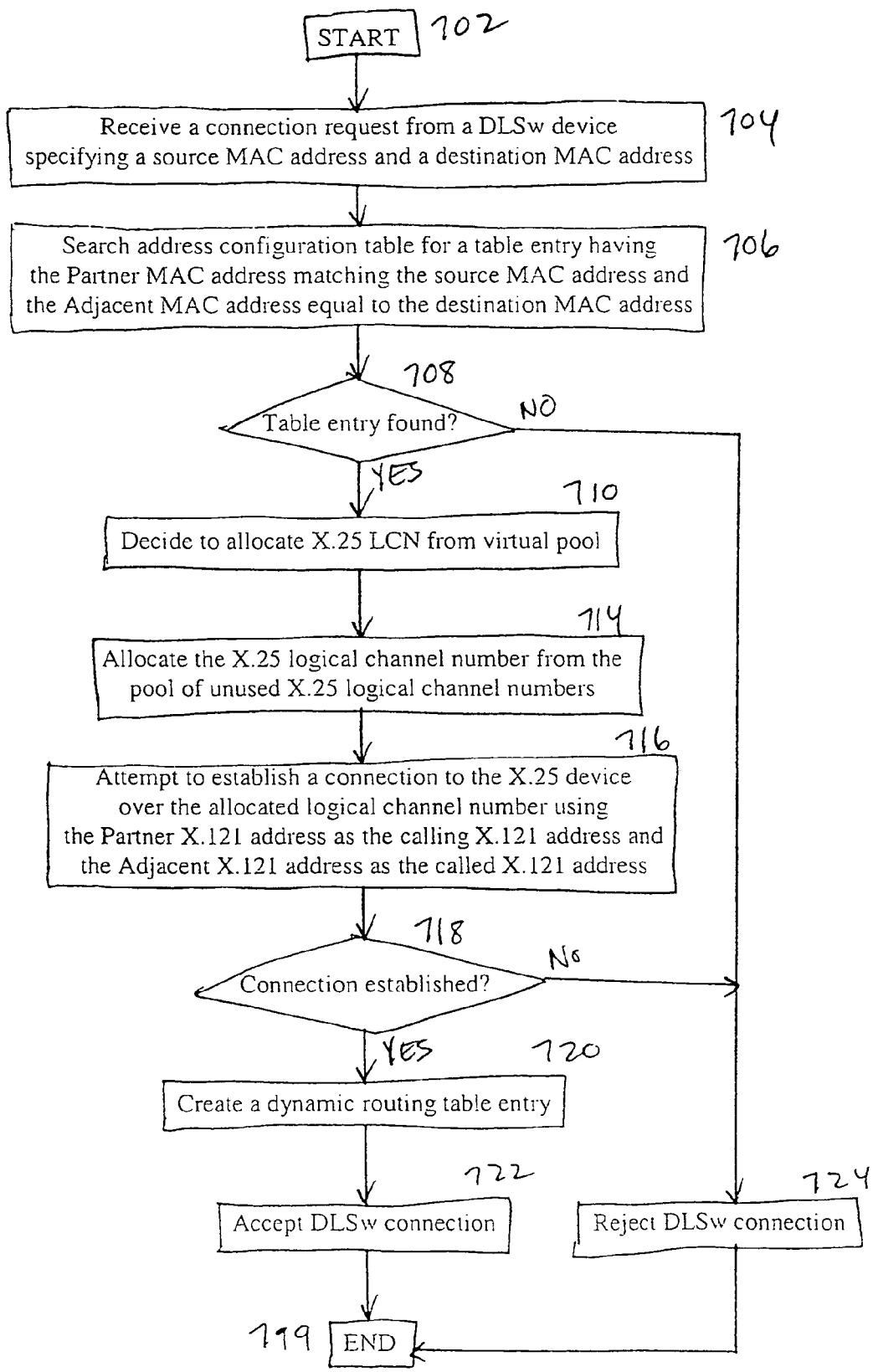
FIG. 7 is a logic flow diagram showing exemplary logic for establishing a connection from a DLSw end station device to an X.25 host device with dynamically allocated X.25 logical channel numbers in accordance with an embodiment of the present invention.

FIG. 7 is a logic flow diagram showing exemplary logic 700 for establishing a connection from an a DLSw device to an X.25 device by the enhanced router device 43. Beginning at step 702, and upon receiving a connection request from a DLSw device specifying a source MAC address and a destination MAC address, in step 704, the logic proceeds to search in the address configuration table for an address configuration table entry having the Partner MAC Address matching the source MAC address and the Adjacent MAC Address equal to the destination MAC address, in step 706. If the logic fails to find such an address configuration table entry (NO in step 708), then the logic rejects the DLSw connection request, in step 724. However, assuming the logic finds such an address configuration table entry (YES in step 708), and upon deciding to allocate the X.25 LCN from the virtual pool of unused X.25 LCNs, in step 710, the logic allocates the X.25 LCN from the virtual pool of unused X.25 LCNs, in step 714, and attempts to establish a connection to the destination X.25 device over the dynamically allocated X.25 LCN using the Partner X.121 Address as the calling X.121 address and the Adjacent X.121 Address as the called X.121 address, in step 716. If the logic is unable to establish the connection to the destination X.25 device (NO in step 718), then the logic rejects the DLSw connection request, in step 724. If the logic is able to establish the connection to the destination X.25 device (YES in step 718), then the logic creates a dynamic routing table entry in the dynamic routing table, in step 720, and accepts the DLSw connection request, in step 722. The dynamic routing table entry includes an Adjacent X.121 Address field equal to the Adjacent X.121 Address from the address configuration table entry, a Partner X.121 Address field equal to the Partner X.121 Address from the address configuration table entry, an X.25 LCN field equal to the dynamically allocated X.25 LCN, an Adjacent MAC Address field equal to the destination MAC address, and a Partner MAC Address field equal to the source MAC address.

Dynamically Allocate Partner X.121 Address

FIG. 14 shows an exemplary address configuration table 1400 for use in the enhanced router device 43 when the enhanced router device 43 dynamically allocates the Partner X.121 Address. The address configuration table 1400 includes a single address configuration table entry 1412 for mapping the DLSw devices (461, 462, 463) to the host SNA mainframe 42. The address configuration table entry 1412 includes a Map Name field 1402, an Adjacent X.121 Address field 1404, a Partner X.121 Address field 1406, an Adjacent MAC Address field 1408, a Partner MAC Address field 1410, and a Flag field 1411. The Map Name field 1402 includes an address configuration table entry name, which, in this example, is "NPSI_host." The Adjacent X.121 Address field 1404 includes the X.121 address 3745 that is associated with the host SNA mainframe 42. The Partner X.121 Address field 1406 is blank (nil). The Adjacent MAC Address field 1408 includes the MAC address 400000000004 that is associated with the host SNA mainframe 42. The Partner MAC Address field 1410 includes a "wildcard" matching all DLSw device addresses. The Flag field 1411 is equal to one, which indicates that there is a "wildcard" in the Partner MAC Address field 1410.

When, for example, the AS/400 463 initiates a connection to the SNA mainframe 42, the AS/400 463 generates a connection request including, among other things, a source MAC address equal to the MAC address of the AS/400 463 (400000000002) and a destination MAC address equal to the MAC address of the SNA mainframe 42 (400000000004). When the enhanced router device 43 receives this connection request from the AS/400 463, the enhanced router device 43 searches the address configuration table 1400 for an address configuration table entry having a Partner MAC Address 1410 matching the source MAC address of 400000000002 and an Adjacent MAC Address 1408 matching the destination MAC address of 400000000004. In this example, the enhanced router device 43 finds the address configuration table entry 1412.

Upon finding the table entry 1412, enhanced router device 43 obtains the corresponding Adjacent X.121 Address 1404 of 3745 from the address configuration table entry 1412, but is unable to obtain the corresponding Partner X.121 Address from the address configuration table entry 1412 since the Partner X.121 Address 1406 is "nil." Therefore, the enhanced router device 43 allocates the Partner X.121 Address from a pool of X.121 addresses. For example, assume that the enhanced router device 43 allocates the X.121 address 8888 from a pool of X.121 addresses. The enhanced router device 43 then attempts to connect to the SNA mainframe 42 over the predetermined X.25 LCN 1 using a calling X.121 address equal to the dynamically allocated Partner X.121 Address of 8888 and a called X.121 address equal to the Adjacent X.121 Address 1404 of 3745. If the enhanced router device 43 is able to establish the connection to the host SNA mainframe 42, then the enhanced router device 43 installs a dynamic routing table entry in the dynamic routing table mapping the AS/400 463 to the host SNA mainframe 42.

FIG. 15 shows an exemplary dynamic routing table 1500 including a dynamic routing table entry 1512 mapping the AS/400 463 to the host SNA mainframe 42. The dynamic routing table entry 1512 includes an Adjacent X.121 Address field 1504 equal to the Adjacent X.121 Address of 3745, a Partner X.121 Address field 1506 equal to the dynamically allocated Partner X.121 Address of 8888, an X.25 LCN field 1507 equal to the predetermined X.25 LCN of 1, an Adjacent MAC Address field 1508 equal to the Adjacent MAC Address of 400000000004, and a Partner MAC Address field 1510 equal to the source MAC address of 400000000002. The enhanced router device 43 uses the dynamic routine table entry 1512 to translate between X.121 addresses and MAC address for communication between the AS/400 463 and the host SNA mainframe 42. For example, when the enhanced router device 43 receives an X.25 packet from the host SNA mainframe 42 including a calling X.121 address of 3745 and a called X.121 address of 8888 over X.25 LCN 1, the enhanced router device 43 uses the dynamic routing table entry 1512 to translate the calling X.121 address of 3745 into a source MAC address of 400000000004 and to translate the called X.121 address of 8888 into a destination MAC address of 400000000002. Similarly, when the enhanced router device 43 receives a DLSw packet from the AS/400 463 including a source MAC address of 400000000002 and a destination MAC address of 400000000004, the enhanced router device 43 uses the dynamic routing table entry 1312 to obtain the X.25 LCN of 1 and to translate the source MAC address of 400000000002 into a calling X.121 address of 8888 and the destination MAC address of 400000000004 into a called X.121 address of 3745.

Figure 16:
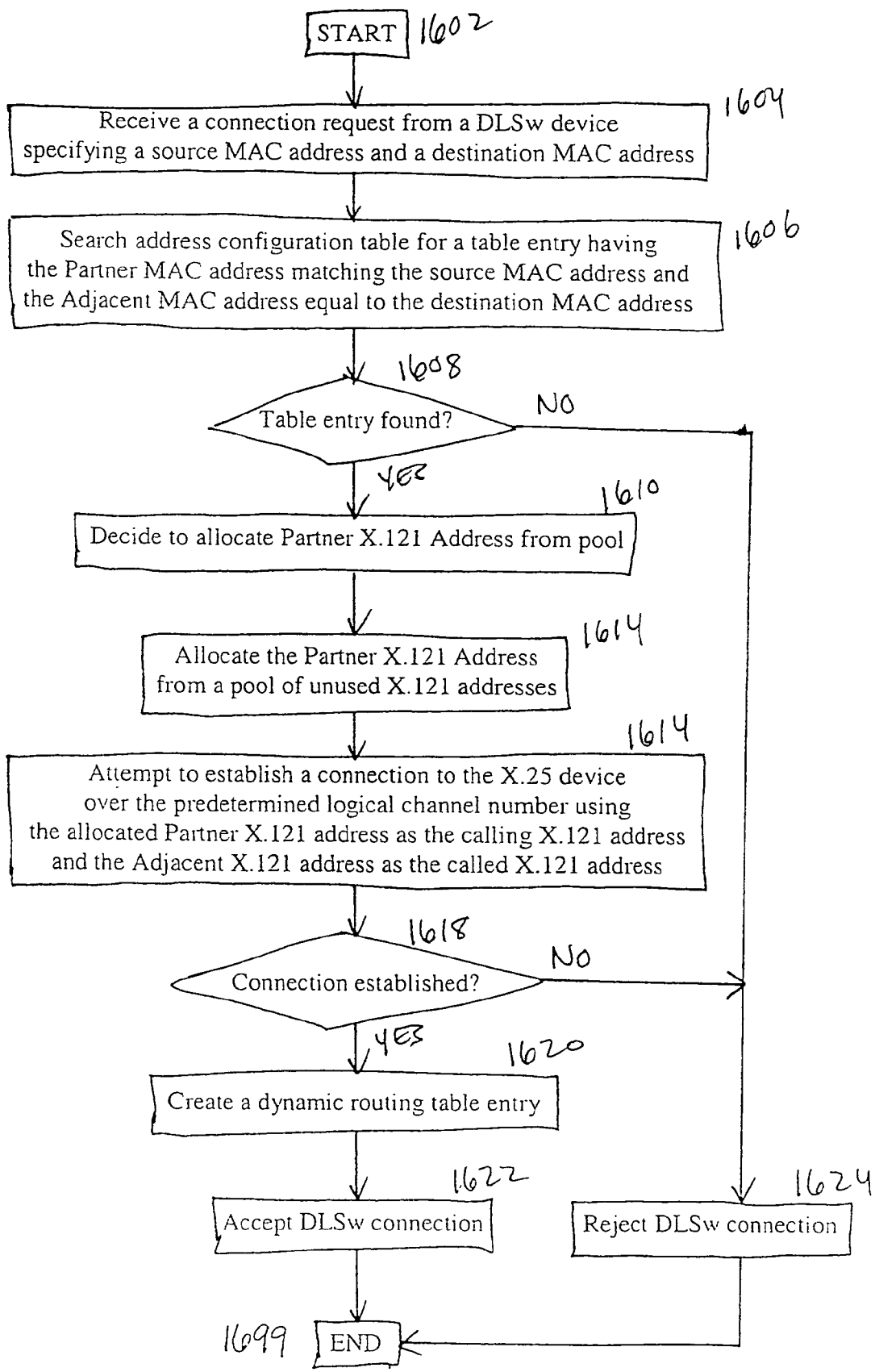
FIG. 16 is a logic flow diagram showing exemplary logic for establishing a connection from a DLSw end station device to an X.25 host device using dynamically allocated X.121 addresses in accordance with an embodiment of the present invention.

FIG. 16 is a logic flow diagram showing exemplary logic 1600 for establishing a connection from an a DLSw device to an X.25 device by the enhanced router device 43. Beginning at step 1602, and upon receiving a connection request from a DLSw device specifying a source MAC address and a destination MAC address, in step 1604, the logic proceeds to search in the address configuration table for an address configuration table entry having the Partner MAC Address matching the source MAC address and the Adjacent MAC Address equal to the destination MAC address, in step 1606. If the logic fails to find such an address configuration table entry (NO in step 1608), then the logic rejects the DLSw connection request, in step 1624. However, assuming the logic finds such an address configuration table entry (YES in step 1608), and upon deciding to allocate the Partner X.121 Address from a pool of X.121 addresses, in step 1610, the logic allocates the Partner X.121 Address from the pool of X.121 addresses, in step 1614, and attempts to establish a connection to the destination X.25 device over a predetermined X.25 LCN using the allocated Partner X.121 Address as the calling X.121 address and the Adjacent X.121 Address as the called X.121 address, in step 1616. If the logic is unable to establish the connection to the destination X.25 device (NO in step 1618), then the logic rejects the DLSw connection request, in step 1624. If the logic is able to establish the connection to the destination X.25 device (YES in step 1618), then the logic creates a dynamic routing table entry in the dynamic routing table, in step 1620, and accepts the DLSw connection request, in step 1622. The dynamic routine table entry includes an Adjacent X.121 Address field equal to the Adjacent X.121 Address from the address configuration table entry, a Partner X.121 Address field equal to the allocated Partner X.121 Address, an X.25 LCN field equal to the predetermined X.25 LCN, an Adjacent MAC Address field equal to the destination MAC address, and a Partner MAC Address field equal to the source MAC address.

An Exemplary Network Device

Figure 5:
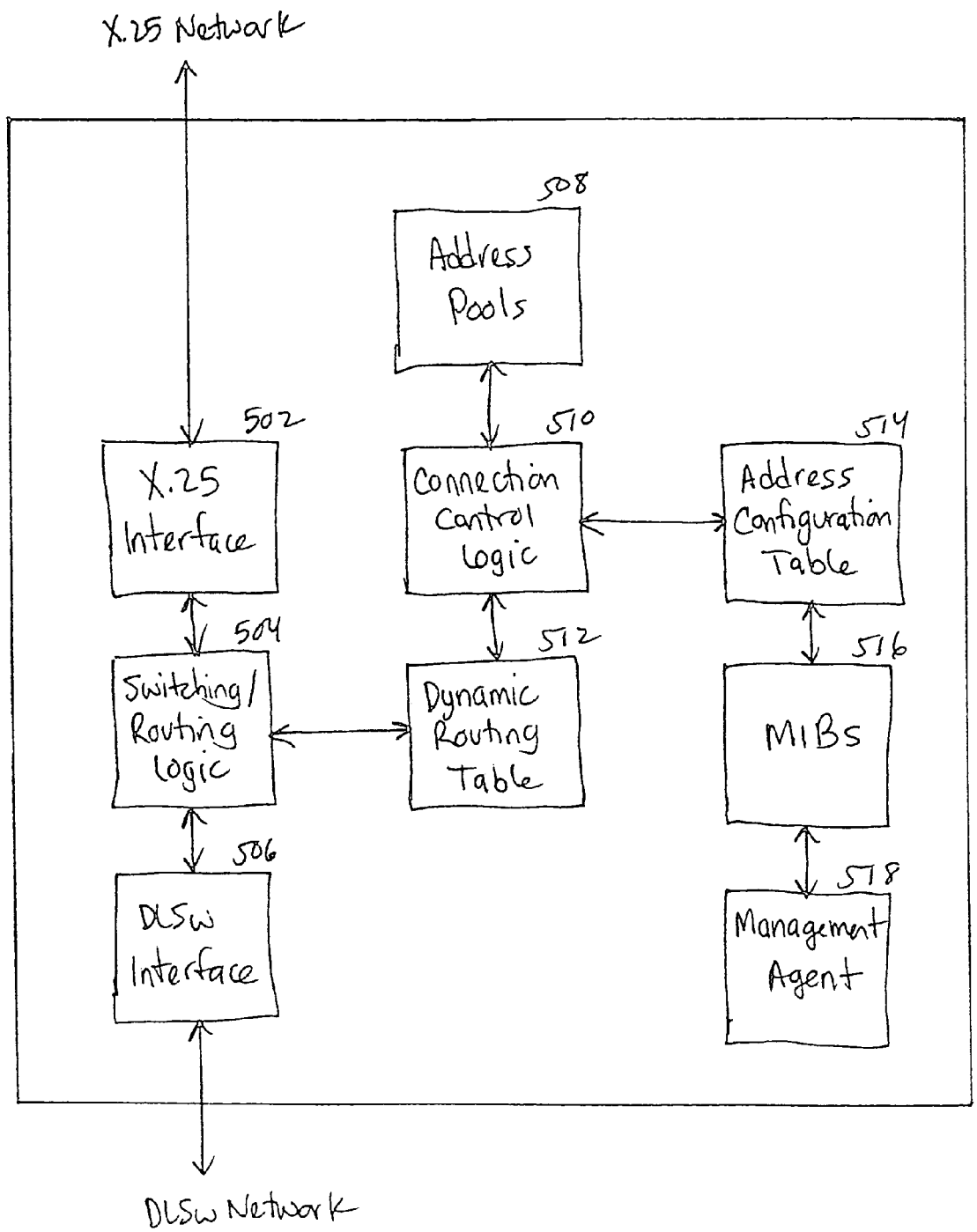
FIG. 5 is a block diagram showing relevant logic blocks of an exemplary network device in accordance with an embodiment of the present invention.

FIG. 5 is a block diagram showing the relevant logic blocks of an exemplary network device 500, such as the enhanced router device 23 shown in FIG. 2 or the enhanced router device 43 shown in FIG. 4. The network device 500 includes, among other things, an X.25 Interface 502, Switching/Routing Logic 504, a DLSw Interface 506, one or more Address Pools 508, Connection Control Logic 510, a Dynamic Routing Table 512, an Address Configuration Table 514, a Management Information Base (MIB) 516, and a Management Agent 518. The Connection Control Logic 510 establishes connections between X.25 devices and DLSw devices. The Connection Control Logic 510 is coupled to the Address Configuration Table 514 and to the Address Pools 508. The Connection Control Logic 510 utilizes the Address Configuration Table 514 to establish the connections, which may include dynamically allocating an Adjacent MAC Address or a Partner X.121 Address from the Address Pools 508. Upon establishing a connection, the Connection Control Logic 510 installs a dynamic routing table entry in the Dynamic Routing Table 512. The Switching/Routing Logic 504 utilizes the Dynamic Routing Table 512 for forwarding packets between the X.25 Interface 502 and the DLSw Interface 506.

In an exemplary embodiment of the invention, the address mapping information in the Address Configuration Table 514 and the MAC addresses in the MAC address pool 508 are configured and viewed through various Management Information Bases (MIBs) 516, which are accessible through the Management Agent 518. The Management Agent 518 is typically a Simple Network Management Protocol (SNMP) agent, in which case the MIBs 516 are SNMP MIBs. Exemplary SNMP MIBs for manaoino the Address Configuration Table 514 and for managing the MAC address pool 508 are shown and described in the related patent application entitled MANAGING ADDRESSES IN A COMMUNICATION SYSTEM, which was incorporated by reference above.

In the exemplary embodiments of the invention described herein, there are certain rules for configuring the addressing information, and in particular for using regular expressions for encoding the Adjacent X.121 Address or the Partner MAC Address. First of all, either the Adjacent X.121 Address field or the Partner MAC Address field may be configured using a regular expression, but not both. A regular expression in the Adjacent X.121 Address field replaces and represents one or more X.121 addresses, where each X.121 address comprises from 1 to 15 decimal digits. A regular expression in the Partner MAC Address field replaces and represents one or more MAC addresses, where each MAC address comprises 12 hexadecimal digits. If the Partner MAC Address field is configured using a regular expression, then the Flag field (MIB management object wfX25QllcAddrMapOptions at the bit position corresponding to the decimal value 4) must be set so that the Connection Control Logic 510 will not mistake the regular expression for an actual MAC address.

Alternative Embodiments

Although an exemplary embodiment of the present invention utilizes the regular expression ".*" (i.e., the two-character string consisting of a period followed by an asterisk) as the "wildcard" in order to match any address, the present invention is in no way limited to using a regular expression as the "wildcard" or using any particular regular expression as the "wildcard." For example, a predetermined address value, such as an invalid address, could be used as the "wildcard." If a regular expression is used as the "wildcard," the regular expression is not limited to the regular expression ".*" or even to a regular expression that matches all addresses. The related patent application entitled ENCODING ADDRESSES TN A COMMUNICATION SYSTEM, which was incorporated by reference above, describes a regular expression syntax that can be used for configuring the "wildcard" address fields. For example, the Adjacent X.121 Address field 904 shown in FIG. 9 could be configured as the regular expression "7777[123]" rather than ".*" in order to match only the addresses 77771, 77772, and 77773. Similarly, the Partner MAC Address field 1210 shown in FIG. 12 and the Partner MAC Address field 1410 shown in FIG. 14 could be configured as the regular expression "40000000000[1-3]" rather than ".*" in order to match only the addresses 400000000001, 400000000002, and 400000000003. Other regular expressions for matching one or more addresses are also possible.

Even though the preceding discussion of address mapping tables has been in the context of a "router", other types of computer network devices could also benefit, including, but not limited to, switches, gateways, bridges, bridge-routers, etc. One specific embodiment is exemplified in the BayRS version 12.10 router software program sold by Nortel Networks, described in the Nortel Networks technical documentation entitled *Configuring X.25 Services*, Nortel Networks part no. 11737-B Rev. 00, the entirety of which is hereby incorporated herein by reference.

Although various embodiments are described herein with reference to a communication system having an X.25 network that is interconnected with a DLSw network through a router, it should be noted that the present invention is in no way limited to any particular network topology or network protocols.

In an exemplary embodiment of the present invention, predominantly all of the connection control logic is implemented as a set of computer program instructions that are stored in a computer readable medium and executed by an embedded microprocessor system within the enhanced router device or other network device. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette. CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

The invention claimed is:

1. An address configuration table stored on a computer readable storage medium, the address configuration table for mapping a plurality of source devices in a source network to a single destination device in a destination network, each device having a source network address and a destination network address, the address configuration table comprising:
   a first address matching field matching the source network addresses of the plurality of source devices;
   a second address matching field equal to the source network address of the destination device;
   a first address translation field equal to the destination network address of the destination device; and
   wherein a connection is established from a first source device in the source network to the destination device in the destination network using the address configuration table.

2. The address configuration table of claim 1, wherein the first address matching field includes a wildcard matching the source network addresses of the plurality of source devices.

3. The address configuration table of claim 2, wherein the wildcard includes regular expression matching the source network addresses of the plurality of source devices.

4. The address configuration table of claim 2, wherein the wildcard includes a default address that implicitly matches the source network addresses of the plurality of source devices.

5. The address configuration table of claim 1, further comprising a second address translation field.

6. The address configuration table of claim 5, wherein the second address translation field is equal to a predetermined value indicating that a destination network address is to be dynamically allocated for each connection initiated by one of the plurality of source devices to the destination device.

7. The address configuration table of claim 6, wherein the destination network is a DLSw network, and wherein the dynamically allocated destination network address is a MAC address for the source device.

8. The address configuration table of claim 6, wherein the destination network is an X.25 network, and wherein the dynamically allocated destination network address is an X.121 address for the source device.

9. The address configuration table of claim 6, wherein the destination network is an X.25 network, and wherein the predetermined value is an X.121 address associated with a network device other than the destination network.

10. The address configuration table of claim 6, wherein the destination network is an X.25 network, and wherein the dynamically allocated logical channel number is an X.25 logical channel number.

11. The address configuration table of claim 1, wherein the source network is a source X.25 network, and wherein the first address matching field matches a plurality of calling X.121 addresses associated with a plurality of source X.25 devices in the source X.25 network.

12. The address configuration table of claim 1, wherein the source network is a source DLSw network, and wherein the first address matching field matches a plurality of source MAC addresses associated with a plurality of source DLSw devices in the source DLSw network.

* * * * *